United States Patent [19]

Girardin

[11] Patent Number: 4,791,331

[45] Date of Patent: Dec. 13, 1988

[54] BRUSH ASSEMBLY FOR ELECTRIC COMMUTATOR MOTORS

[75] Inventor: Jean-Claude Girardin, La Chaux-de-Fonds, Switzerland

[73] Assignee: Portescap, La Chaux-de-Fonds, Switzerland

[21] Appl. No.: 38,131

[22] Filed: Apr. 14, 1987

[30] Foreign Application Priority Data

Apr. 14, 1986 [CH] Switzerland ........................ 1476/86

[51] Int. Cl.[4] ........................................ H02K 13/00

[52] U.S. Cl. ................................ 310/248; 310/229; 310/230; 310/249

[58] Field of Search ............... 310/248, 249, 220, 221, 310/219, 222, 42, 229, 230, 239, 241, 242, 244, 245, 246, 247, 251, 252, 237, 238, 240

[56] References Cited

U.S. PATENT DOCUMENTS

| | | | |
|---|---|---|---|
| 731,740 | 6/1903 | Bassett | 310/244 |
| 2,029,171 | 1/1936 | Lundquist | 310/242 |
| 2,481,499 | 9/1949 | Collura | 310/246 |
| 2,545,365 | 3/1951 | Lang | 310/242 |

FOREIGN PATENT DOCUMENTS

| | | | |
|---|---|---|---|
| 1904676 | 8/1970 | Fed. Rep. of Germany | 310/248 |
| 1181029 | 9/1985 | U.S.S.R. | 310/238 |
| 1134498 | 11/1968 | United Kingdom | 310/239 |

*Primary Examiner*—R. Skudy
*Attorney, Agent, or Firm*—Cushman, Darby & Cushman

[57] ABSTRACT

The contact surface (8') is constantly urged against the commutator (9) by spring means. The brush material is progressively worn away, without changing the shape of the contact surface (8'), owing to the rotation of the commutator (9). A cylindrical slot (17) separates the outer portion (5') of the brush body (5) from the inner portion (5*b*) thereof. Thus, the contact surface (8') is kept separated from the cylindrical portion (16') of the outer surface of the brush body as long as the brush material is not worn away to reach the merging zone of the portions (5*a*) and (5*b*) of the brush body. This allows a substantial limitation of the risk of sparking between the brush body and the commutator to be achieved, thus avoiding deposit of a carbon layer onto the peripheral surface of the commutator.

2 Claims, 1 Drawing Sheet

BRUSH ASSEMBLY FOR ELECTRIC COMMUTATOR MOTORS

The present invention relates to electric motors with cylindrical commutators and more particularly to a brush assembly for such motors.

The U.S. Pat. No. 2,545,365 of Mar. 13, 1951 discloses a brush assembly of the type comprising a disk-shaped body mainly made of carbon or another suitable electrically conducting brush material, which body is pivotally mounted on a central stud and urged rotationally against the commutator. In operation, the bursh is gradually worn away around its circumference, tangentially to the circumference of the commutator.

This known arrangement appeared however to have major drawbacks which in fact prevented an introduction of such assemblies on an industrial basis, in spite of the basic advantages thereof which thus could not be exploited usefully. Such basic advantages are the possibility of realizing brushes in a compact structure and of avoiding long arms between the contact surface and the pivot axis thus avoiding vibration of the arm bearing the contact surface and the risk of breaking of the arm generally made of carbon.

More particularly, the formerly proposed brush assembly as shown in the above mentioned U.S. patent leads to the production of sparks and accordingly to the deposit of carbon on the commutator which resulted in bad electrical contact properties and further on in discontinuation of the motor operation. This problem remained unresolved up to now.

It is the main object of the invention to provide a brush assembly of the type mentioned above, which allows a failureless operation of the commutator and a long life of the brush assembly. More specifically an object of the invention is to avoid the production of sparks and to achieve a very good electrical contact between the brush and the commutator throughout the life of the brush, as well as to avoid any interference of the brush operation with the bearing of the commutator.

With a view to these objects, the brush assembly according to the invention comprises a cam-shaped brush body of electrically conducting material having at least one cylindrical contact surface, means for pivotally mounting said brush around a pivot axis, and spring means for rotationally urging said brush with its contact surface against said commutator, said brush having a substantially cylindrical slot formed by two spaced apart surfaces which are substantially cylindrical and coaxial with respect to said pivot axis, said slot separating an outer porter of said brush forming said contact surface from an inner portion of said brush surrounding said pivot axis.

The invention is based on the recognition that the mentioned drawbacks of the known devices are the consequence of the fact that, in the previous structure, a portion of the contact surface between the cylindrical commutator surface and the brush is situated, when seen in the direction of the motor and brush pivot axes, at the intersection with a straight line joining the points representing said axes. At this portion there exists of course no radial force urging the brush against the commutator and therefore no good electrical contact is made in the corresponding zone. This was found to lead to sparking and the resulting deposit of carbon on the commutator surface as mentioned above. Furthermore, since two brushes are generally used in diametrical opposite relationship, a mechanical problem arises due to the bearing clearance in the radial direction of the commutator axis since the contact surfaces of the brushes in said diametrically opposite zones of the commutator are at a fixed distance. Also, then wear is produced at those zones, this further increases the bad operation of the commutator.

Thanks to the cylindrical slot provided in accordance with the invention, the central portion of the brush is always at some distance from the commutator and the actual contact or wearing portion of the brush at the outer part thereof is continuously subjected to the pressure of the spring, at any degree of wear of the brush.

Additional objects and advantages of the brush assembly of the present invention will be clear from the following description of a preferred embodiment thereof which is illustrated in the accompanying drawings, in which.

Figure 1:
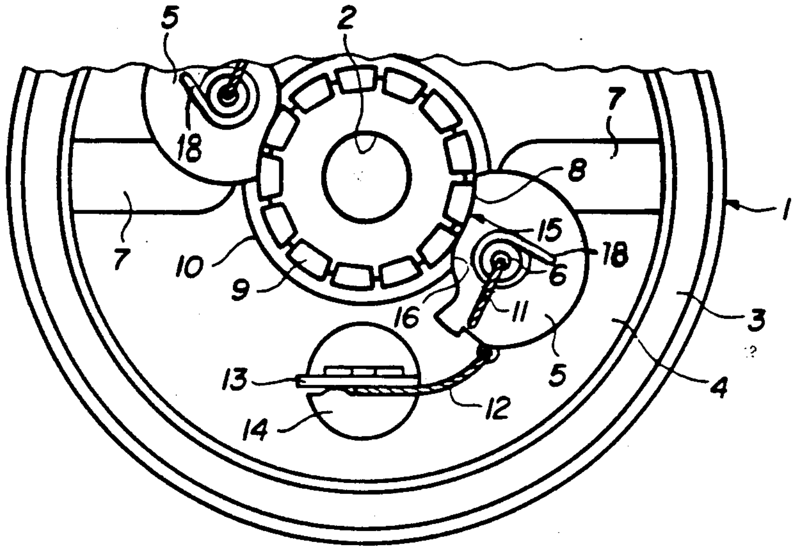
FIG. 1 (PRIOR ART)
FIG. 1 is a front elevation of a portion of the inner side of an end part of an electric motor with cylindrical commutator, seen in the direction of the commutator axis, this view showing the relation between the brushes and the commutator, in the case of a brush assembly comprising a cam-shaped brush according to the above-mentioned prior art.

In the drawings, FIG. 1 shows a portion of an end part or brush carrying unit 1 of a direct current motor. Brush carrying unit 1 has a generally cylindrical configuration and is made of a rigid plastic moulding. A central opening 2 is designed to accommodate the rotor axis of the motor (not shown). The space provided between the inner surface of the side wall 3 of brush carrying unit 1 and the circular inner face 4 of the latter forms a room which accommodates two brushes 5 which are each pivotally mounted around respective pivot axes, i.e. studs 6 attached to unit 1 or integral therewith. Pivot axes 6 are either entirely made of a metal having good electrical conductive properties e.g. brass or are surrounded by a portion made of such a metal and they are each respectively electrically connected on one hand to corresponding brush 5, by means of an electrically conductive wire 11, which is suitably made of copper or copper alloy, and, on another hand, to an electrically conductive blade 13 by means of an electrically conductive wire 12, which is also suitably made of copper or copper alloy. Blade 13 extends through the end wall of brush carrying unit 1 in order to provide for electrical connection with either one of the motor input terminals (not shown) which are mounted on the outer face of said end wall.

Blade 13 and the corresponding end of wire 12 are clamped together in a diametral slot of a plug 14 which is integral with unit 1.

Owing to the fact that the two brushes 5 and the two corresponding plugs 14 are arranged symmetrically with respect to the axis of unit 1, only a portion of this unit 1, carrying one brush 5 and the corresponding plug 14, has been illustrated in the drawings.

The inner surface 4 of unit 1 comprises two protruding mouldings 7 which are each respectively associated with a brush 5 and on which bears a corresponding rotation biased coil spring 18 which is centered on the pivot axis 6 of the corresponding brush and tends to impart to said brush a counter-clockwise rotation so as to urge the brush with its contact surface 8 against the commutator 9. A perpendicular section of the latter with respect to the axis of the rotor of the electrical motor is shown in the drawings.

A recess, which is delimited by a circular edge 10, is provided in the face 4 of unit 1, coaxially with the opening 2, so as to accommodate the end portion of commutator 9. The contact surface 8 of brush 5 is always urged against the surface of the commutaor 9 with a substantial pressure by the force of the coil spring 18 and the rotation of the commutator 9 causes progressive wear of the brush 5 so that the brush material at the contact surface 8 is worn away without change of the shape of said contact surface. However as the wear of the brush proceeds, the generally cylindrical portion 16 of the outer surface of brush 5 tends to extend, while remaining tangent with the commutator 9 along a line which is indicated by the arrow starting from the reference number 15. This line forms the boundary between the cylindrical portion 16 of the outer surface of the brush 5 and the contact surface 8. It is easily apparent that the area of the portion 16 of the brush outer surface which is situated in the close vicinity of said line is placed at a very short distance from the commutator 9 so that sparks are generated in this area between the commutator and the brush. These sparks cause the deposit of an insulating carbon layer onto the surface of the commutator, which results in the above mentioned drawback.

Further, owing to the fact that the cylindrical portion 16 of the outer surface of brush 5 is tangent with commutator 9, rotation of the commutator is possible only if it is perfectly centered, at equal distances from the axis of rotation of the two brushes 5' and also if its peripheral surface has a perfect cylindrical shape. Such conditions can be met only by observance of very strict constructive standards which are not feasible in the case of industrial manufacturing. This is a further drawback which, together with the above mentioned deposit of insulating carbon layer onto the surface of the commutator, has prevented the industrial use of this type of brush assemblies.

Figure 2:
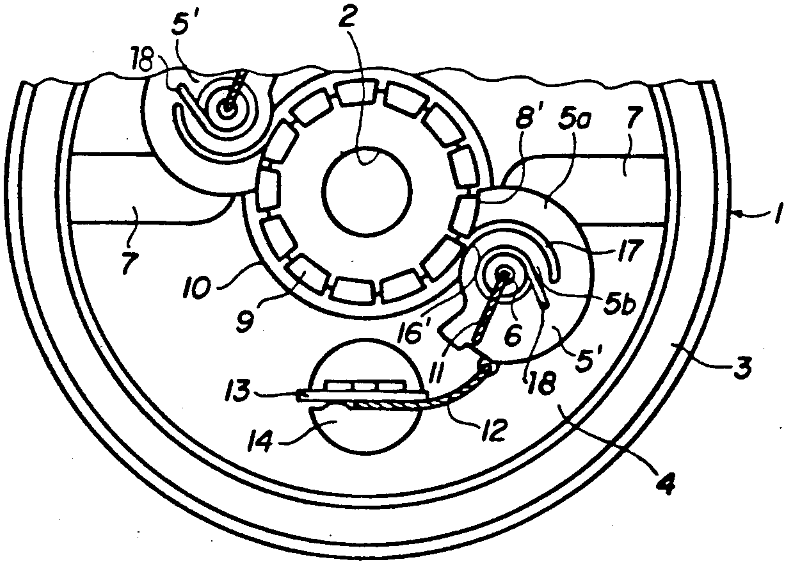
FIG. 2 is a front elevation view, similar to that of FIG. 1, illustrating a preferred embodiment of the brush assembly embodying the invention.

Referring now to FIG. 2, in which the parts which are identical to those of the brush assembly of FIG. 1 are respectively identified by the same reference numerals, the general arrangement of brushes 5' and their relative disposition with respect to commutator 9 in the brush assembly embodying the invention are seen to be the same as in the case of the known brush assembly illustated in FIG. 1.

However, in the brush assembly embodying the invention, the brush 5' has a substantially cylindrical slot 17 formed by two spaced apart curved surfaces which are coaxial with respect to the pivot axis 6 of brush 5'.

Thus, slot 17 separates an outer portion **5*a* of brush 5', the free end of which forms the contact surface 8' of the brush with the commutator 9, from an inner portion 5*b* surrounding the pivot axis 6. Thus, the contact surface 8' is separated from the cylindrical portion 16' of the outer surface of brush 5' by slot 17, at any degree of wear of the brush, as long as slot 17 is present, i.e. as long as the brush material at the contact surface 8' is not worn away to reach the merging zone of the portions 5*a* and 5*b* of the brush 5'. It will be easily apparent that the cylindrical portion 16' has no line (similar to line 15 of FIG. 1) where the brush 5' is tangent with the commutator 9 and that all areas of this portion 16' of the outer surface of brush 5' are spaced apart from the commutator 9** by a distance sufficiently great to avoid the risk of sparking between the brush and the commutator.

Such result may be achieved in industrial use conditions, for instance in the case of a brush 5' with a peripheral surface having a radius of 4 mm in its portion which is situated at the greatest distance from its pivot axis 6, in particular in the portion **5*a*, and a radius of 2 mm at the cylindrical portion 16' of the surface of its inner portion 5*b*, by imparting a width of about 0.4 mm to slot 17**.

It will be clear that the use of the brush assembly embodying the present invention permits a substantial limitation of the risk of sparking between the brush and the commutator to be obtained.

Further, owing to the fact that the commutator only contacts the brushes at the contact surface 8', which is formed at the end of the outer portion **5*a* of the brush, the rotation of the commutator is never hindered even if it is not perfectly centered and cylindrically conformed, since said portion 5*a*** has some flexibility.

I claim:

1. A brush assembly for electric motors having a cylindrical commutator, comprising: a cam-shaped brush of electrically conducting material having at least one cylindrical contact surface; means for pivotally mounting said brush around a pivot axis; and spring means for rotationally urging said brush with said contact surface against the commutator, said brush having a substantially cylindrical slot formed by two spaced apart surfaces which are substantially cylindrical and coaxial with respect to said pivot axis, said slot separating an outer arcuate portion of said brush, one end of which forms said contact surface, from an inner arcuate portion of said brush surrounding said pivot axis which does not contact the commutator.

2. A brush assembly as claimed in claim 1, wherein said brush is made of carbon.

* * * * *